INVENTOR.
KENNETH E. CUREWITZ
BY Robert J. Zinn
ATTORNEY

Sept. 26, 1967 K. E. CUREWITZ 3,344,404

MULTIPLE MODE DATA PROCESSING SYSTEM CONTROLLED BY INFORMATION BITS OR SPECIAL CHARACTERS

Filed Sept. 10, 1964 3 Sheets-Sheet 2

INVENTOR.
KENNETH E. CUREWITZ
BY Robert J. [signature]
ATTORNEY

Sept. 26, 1967 K. E. CUREWITZ 3,344,404

MULTIPLE MODE DATA PROCESSING SYSTEM CONTROLLED BY INFORMATION BITS OR SPECIAL CHARACTERS

Filed Sept. 10, 1964 3 Sheets-Sheet 3

INVENTOR
KENNETH E. CUREWITZ

BY Robert J. Zimin

ATTORNEY

United States Patent Office 3,344,404
Patented Sept. 26, 1967

3,344,404
MULTIPLE MODE DATA PROCESSING SYSTEM CONTROLLED BY INFORMATION BITS OR SPECIAL CHARACTERS

Kenneth E. Curewitz, Framingham, Mass., assignor to Honeywell Inc., a corporation of Delaware Filed Sept. 10, 1964, Ser. No. 395,428
11 Claims. (Cl. 340—172.5)

ABSTRACT OF THE DISCLOSURE

Sequencing control means for a character oriented data processing apparatus wherein a plurality of information bits of a particular character normally define a mode of operation to be executed by said data processing apparatus; and wherein the occurrence of a special bit or bit configuration in association with the mode of operation defining character of an instruction, but separate and apart from the respective information bits thereof, cause the normal significance of the information bits of that character to be disregarded and control of the data processing apparatus to be exercised in accordance with the control bits associated therewith.

The present invention is directed to an electronic apparatus for processing data and more specifically to means for controlling the sequencing of operations therein whereby maximum economy of both memory space and processing time is realized.

In a data processing apparatus, it is often deirable to utilize a variable length format both with respect to the operative instruction and the data field. In this respect, it has heretofore been proposed to process information on a character basis. Accordingly, in a character-oriented system, a predetermined number of information bits may be combined with appropriate punctuation and error checking bits to define an operational character of unit length. In order to construct an instruction capable of conveying sufficient information to establish complete control of an operative routine, a number of characters are selectively combined in accordance with any one of a plurality of formats. This selective combination of characters may be facilitated by using particular bit configurations to define the limits of an instruction. It has also been proposed to utilize a special level or plane of bits in combination with particular bit representations to effect the desired punctuation. Thus, in a character consisting of seven bit positions, the contents of the first six levels or planes of bits may be used in particular code combinations to convey information, while the contents of the seventh bit position may be used to define the length of the program instruction or the limits of a data field.

The processing of a program instruction within a character-oriented system may proceed with the extraction of characters of information from succeeding main memory locations whereafter the extracted information is transferred into associated storage registers to be used during the execution phase of the processing of the program instruction. In one embodiment of the present invention, each character of information is comprised of a plurality of levels of punctuation bits which in addition to defining the limits of the program instruction are also effective in certain instances to identify a particular operation.

It is therefore a primary object of the present invention to provide a new and improved character-oriented data processing apparatus having highly flexible capabilities relative to the formulation of a program instruction through the selective combination of a plurality of characters.

It is another more specific object of this invention to provide a data processing apparatus uniquely arranged to be responsive to a plurality of levels of punctuation bits to both define the limits of a program instruction and in certain instances to establish the nature of a particular operation.

In the processing of a program instruction, the first character of an instruction to be extracted from the main memory may be a single character operational code which defines the fundamental operation to be performed. In addition to information bits, a character of information, as utilized in a preferred embodiment of the present invention includes two levels of punctuation as well as a single level error-checking bit. In accordance with the organization of the preferred embodiment, the operational code character, hereinafter referred to more simply as the *Op* code, has associated therewith a first level of punctuation which identifies it as being the first character of the program instruction. A second level of punctuation is similarly utilized except insofar as concerns its use in combination with the first character of a program instruction wherein it in itself defines a particular program operation.

Each program instruction generally has two address portions associated therewith which may be designated as the A address and the B address fields. The information in the address fields may indicate the starting address locations of the operand fields as stored in the main memory. Thus, the information in the address field of an instruction may refer to the address location in main memory of the first character of an operand. The remaining digits of an operand may be stored in successive higher or lower numbered memory locations within the main memory. One or more variant characters may also be included in the instruction format to modify the *Op* code of the instruction so as to supplement the information supplied thereby.

Once initiated, the referencing of successive main memory locations continues in the preferred embodiment of the present invention until a first level punctuation bit is detected in association with the extraction of a character thereby identifying that character as the *Op* code of the succeeding program instruction and at the same time indicating that the extraction phase of the program instruction presently being processed has been completed. This terminates the extraction phase of the program instruction since the various characters which define the operation to be performed and the memory locations of the operands involved are established and the required information is stored in the prescribed registers. The extraction phase of the processing of the program instruction will be followed by the execution phase wherein the operands specified are operated upon in the prescribed manner.

It should be understood that the principles of the present invention are not limited to the use of punctuation bits to effect the optional mode of operation; but encompasses the use of other special bit levels which would normally go unused at the time the *Op* code character is being extracted. In this respect, it is further possible to practice the present invention by introducing one or more entirely separate control bits.

Accordingly, it is another object of the present invention to provide a new and improved data processing apparatus which provides means responsive to the presence of a binary one in a particular bit plane associated with the first or *Op* code character of a program instruction to define completely a particular program operation.

The utilization of a special control bit, or alternatively an otherwise unused level of punctuation, to identify a particular machine operation has real advantage in increasing the efficiency of operation of certain operative routines. In this respect, a preferred embodiment of the present invention concerns the utilization of a presently unused level of punctuation to effect a change sequence mode operation. More specifically, the association of a bit in the second punctuation bit level with the first character of a program instruction immediately initiates a change sequence mode operation wherein the contents of the sequence register associated with a control memory in the present invention is interchanged with the contents of the co-sequence register thereof. This method of implementing the change sequence mode operation proves to be of particular convenience when adapted to translational routines involving the adaptation of a machine program originally compiled for a foreign data processing apparatus to a similar data processor, but one which is not completely compatible with respect to instruction format.

The adaptation of a computer program originally compiled on a foreign data processing apparatus to a similar processor is most efficiently effected if a "one-for-one memory mapping" can be preserved. For purposes of this invention, "one-for-one memory mapping" refers to the allocation of addressable main memory locations within the memory of a present data processing apparatus on the same basis as originally allocated in a program compiled on a foreign data processing apparatus. Thus any location specified in the computer program as originally compiled will be meaningfully interpreted when the program is run on a similar processor, such as is utilized in the preferred embodiment of the present invention. This means that any location in the main memory of a foreign data processing apparatus as occupied by a program instruction or data field will be similarly occupied in the memory of the data processing apparatus of the present invention. However, due to differences in addressing techniques, i.e., the use of binary coded decimal as opposed to straight binary coding, in instruction formats, and in processing operations, it may be possible to facilitate the representation of particular program operations in a minimum number of operational characters in the program as compiled for operation on the foreign data processing apparatus, while an additional one or more characters may be needed to represent the same program instruction in the data processing apparatus of the present invention.

In a situation where a particular program instruction is originally compiled for operation on a foreign data processing apparatus through the representation of a single character, and an attempt is made to process the program in another data processing apparatus wherein duplication of the instruction cannot be effected with a single character, the preservation of the "one-for-one memory mapping" has heretofore been effected by initiating a change sequence mode operation at this point. As mentioned above, the change sequence mode operation would initiate an interchange of the sequence and co-sequence registers of the control memory so that the program operation would be automatically transferred to the location of main memory as specified by the former contents of the co-sequence register. This intermediate transfer to a separate area of memory is required in order that the program instruction, which can only be implemented in the present data processing apparatus through an extended instruction, i.e. by way of a plurality of characters, may be so implemented while at the same time preserving the "one-for-one memory mapping."

In a conventional system where but a single character is available to express the incompatibility of a program instruction as originally compiled on a foreign data processing apparatus and as presently appearing in the conventional system, the available character space may be used to define the O*p* code of the change sequence mode instruction. Accordingly, a program to be translated is first scanned to detect any incompatible instruction and the O*p* code of a change sequence mode instruction substituted therefore. However, during the actual processing and after a signal has been detected indicating that a change sequence mode instruction has occurred, it is still necessary to identify the location in the additional portion of main memory which contains the extended version of the incompatible instruction. In the past, this has been accomplished by comparing the address of the location in main memory at which the present change sequence mode instruction is detected, with prestored values in a look-up table. The look-up table may comprise a separate portion of main memory wherein is housed a listing of all incompatible program instructions as well as the extended version of the incompatible program instruction.

The inefficiences of the above-outlined conventional method of translation are immediately apparent both with respect to time and space. It has been estimated that on the average in a translation routine, one-quarter of all the program instructions necessitate the use of additional memory space to effect their translation. As mentioned above, it was previously necessary to associate each change sequence mode instruction with its location in the program and thereby locate the extended version of the program instruction. This means that, on the average, the number of comparisons which need be effected in associating the non-compatible main memory location of a particular change sequence mode instruction with its extended version as stored in a separate portion of the main memory, is equal to approximately 12½ percent of the total number of program instructions. This further means that additional memory space must be provided which is again on the order of 25 percent of the length of the original program. By adapting the principles of the present invention to the above-outlined problem associated with the translational routine involved in the adaptation of a program compiled for a foreign computer to a similar, but not completely compatible, data processing apparatus, an appreciable savings in both processing time and memory space will be realized.

Accordingly, it is a further object of the present invention to provide an improved data processing apparatus including means to facilitate the efficient translation therein of a program originally compiled for a foreign data processing apparatus.

It is possible to view a system implemented in accordance with the principles of the present invention as being responsive to either of two O*p* codes of different priority. The O*p* code of higher priority is implemented to be optionally employed at the discretion of the programmer. Accordingly, designation by the programmer of the particular mode of operation, in company with a bit representation associated with the first character of a program instruction to be extracted, will result in the automatic substitution of the O*p* code of higher priority for that of lower priority. This concept may be further extended to include means for detecting one or more control bits occurring singly or in a coded representation and in combination with any of the various characters of a program instruction, to define alternative control paths for that instruction.

Accordingly, it is another more general object of the present invention to provide a new and improved data processing apparatus which provides means responsive to the presence of a special control bit or bits associated with the O*p* code of a program instruction to effect the automatic substitution of an associated O*p* code of higher priority for that of lower priority.

A still more general object of the present invention is to provide a new and improved character-oriented data processing apparatus wherein the presence of a particular bit representation may signify the selection of a control path of first priority and wherein the absence of said particular bit representation may be effective in initiating the selection of an alternative control path of secondary priority.

In the adaptation of the principles of the present invention to the translational problem outlined above, the detection of a particular punctuation bit in the first character of a program instruction immediately denotes that a change sequence mode of operation is in order. In addition, the information bits of this character are then automatically interpreted as a parameter of information which may be used to identify any one of a plurality of possible subroutines. Once the identity of a particular subroutine has been established, the processing of successive instructions thereof will follow automatically. The processing of the last instruction of the subroutine effects a withdrawal from the change sequence mode operation so that the digital representations in the sequence and co-sequence register of the control memory are once more interchanged and the operation of the foreign program continues.

It is therefore a further more specific object of the present invention to provide a data processing apparatus which is capable of efficiently translating a program originally compiled for a foreign data processing apparatus and wherein the first character of a non-compatible instruction may have associated therewith a bit in a special bit level to identify a particular mode of operation and wherein the normal information bits of the first character are utilized to establish a parameter of information pertinent to the translation process.

An electronic data processing apparatus constructed in accordance with the principles of the present invention may include an addressable main memory for storing characters of information expressed as a binary coded representation and further include a plurality of registers operatively connected to the output thereof. A main memory address register connected to the input of the main memory may be provided for referencing a particular location therein in accordance with the digital representation of an address field transferred into the main memory address register. In addition, a control portion may be provided for enabling the main memory address selection circuit to cycle through a particular program instruction. The control portion comprises a plurality of multi-character storage registers including a sequence register and at least an A and a B operand register. Additional means may be provided for initiating the transfer of a digital representation normally stored in the sequence register of the control portion, to the main memory address register. The digital representation transferred into the main memory address register is then incremented and returned to the sequence register to be used in the selection of the succeeding character of information. The main memory location, as referenced by the digital representation of the main memory address register, is somewhat simultaneously transferred into a main memory local register associated with the main memory. Means are operatively connected to the main memory local register to detect the presence of a bit in a particular punctuation bit level of the first character of an instruction being extracted from main memory. As mentioned above, the detection of a bit in the particular puctuation bit level immediately identifies the character as that of a change sequence mode instruction wherein the information bit contents of the character represent any one of a plurality of subroutines. Means are further provided to effect the substitution of the O*p* code of a change sequence mode instruction for the digital representation extracted with the defining punctuation bit and for loading the O*p* code of the change sequence mode instruction into an associated O*p* code register.

Upon detection of the change sequence mode instruction in the O*p* code register, an interchange of the sequence and co-sequence registers of the control memory is effected whereafter subsequence characters of the particular change sequence mode instruction are extracted from main memory in the normal manner and upon completion of the extraction phase, the execution phase of the change sequence mode instruction will be entered.

In the preferred embodiment of the present invention, the representation, originally in the co-sequence register and presently in the sequence register, is in fact the O*p* code of a binary add operation which directs the system to double the binary value of the informational content of the first character of the program instruction which precipitated the present change sequence mode operation, and to thereafter redouble the resultant representation. This redoubled or quadrupled representation is then added to a base address which address refers to a location in a table of subroutines. The table of subroutines is analogous to the extended program instructions as mentioned above.

Means are also provided to register an indication of the mode of operation of the data processing system as to whether it is to be responsive to the presence of a bit in the particular punctuation bit level. This may be effected through the use of a single flip-flop under the control of the programmer which is accordingly set or reset to indicate the present mode of operation. Inasmuch as the particular punctuation bit to which the apparatus of the preferred embodiment of the present invention is responsive is designated an "item-mark," the mode of operation referred to above is appropritaely designated the item mark trapping mode.

The foregoing objects and features of novelty which characterize the invention, as well as other objects of the invention, are pointed out with patricularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
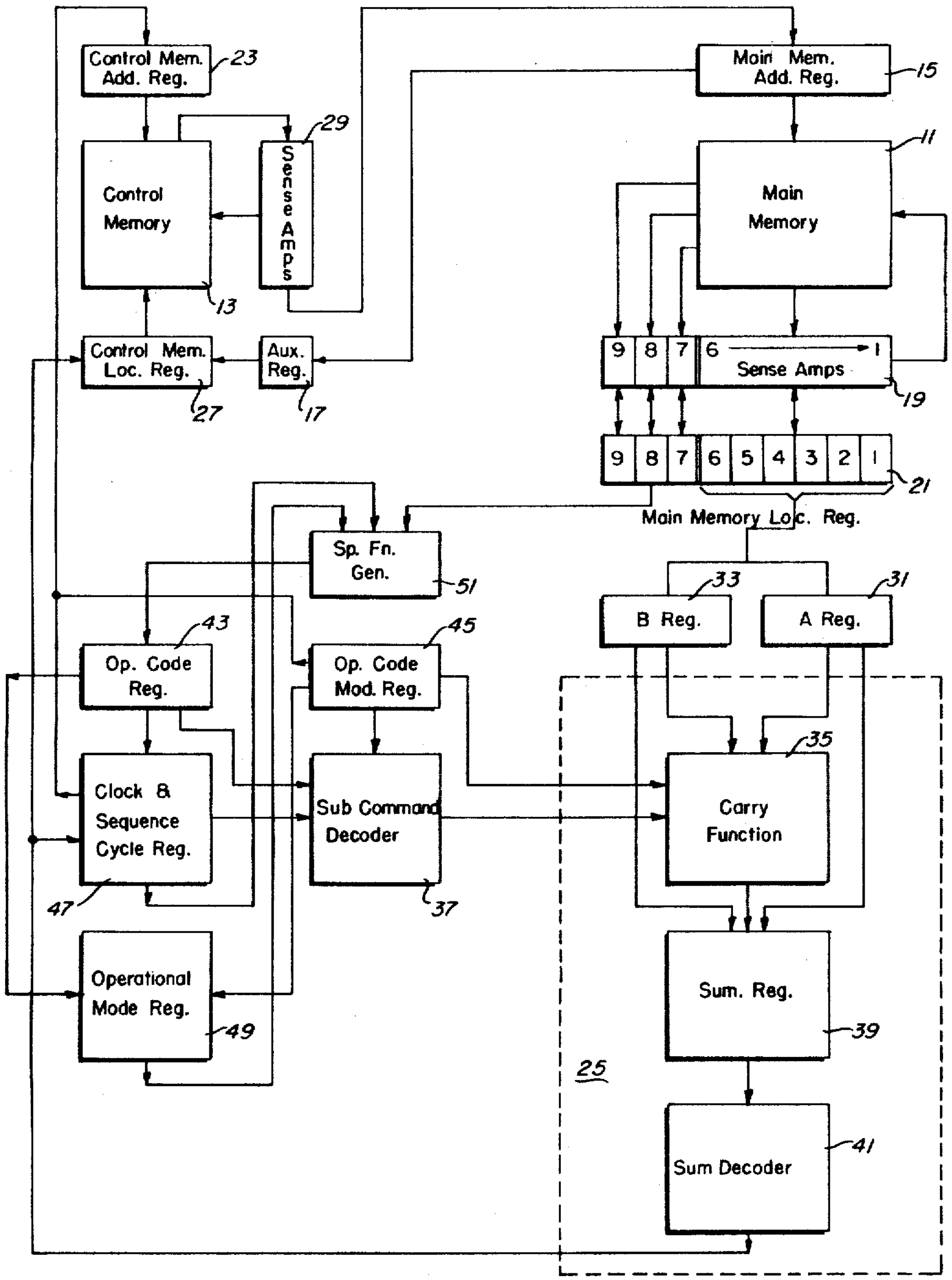
FIGURE 1 is a diagrammatic representation of a data processing apparatus incorporating the principles of the present invention.

Referring first to FIGURE 1, therein is shown a portion of an electronic data processing system constructed in accordance with the principles of the present invention and which comprises a central processor including a main memory 11 which may further comprise a multi-plane coincident core storage unit of the form described in the co-pending application of Henry W. Schrimpf, filed Jan. 25, 1957, bearing Ser. No. 636,256. Access to the main memory 11 from a control memory 13 may be provided by a multi-stage main memory address register 15 which contains the address of the location within main memory being referenced. Associated with the main memory address register 15 is an auxiliary register 17 whose function it is to indicate whether the contents of the main memory address register 15 is to be incremented, decremented, or transmitted unchanged to a designated area of the control memory 13.

Information leaving the main memory 11 is transferred via a plurality of conventional sense amplifiers indicated generally as member 19. A separate sense amplifier is associated with each bit level of the digital representation stored in a location of main memory. In a preferred embodiment of the present invention, there are included six information and two punctuation or special bit levels plus one level used for error checking purposes. Thus, in addition to an error checking bit, each character carries with it six informational bits and a first and a second level of punctuation bits. As indicated, means are provided to restore to its original location in main memory, the bit representation transferred into the sense amplifiers 19. The digital representation of an addressed storage location of main memory is transferred via output lines associated with the sense amplifiers 19 to the input of the main memory local register 21 which also provides means for entering information into main memory locations. Means, not shown, and associated with the main memory local register 21, utilize the error checking bit to generate checking information pertinent to the information bits being brought into memory and to recheck the information bits as they are withdrawn.

The control memory 13 is comprised of a plurality of multi-position storage registers which store information pertinent to the processing of the various program instructions. In this respect, all the program instructions are processed through the control memory which aids in the selection, interpretation, and execution of these in order. In performing these functions, the control memory 13 coordinates the various activities of receiving data, effecting an inter-memory transfer within the central processor, and transferring processed data to the various peripheral devices.

In a preferred embodiment of the present invention, there are included in the control memory repertoire A and B operand address register, sequence and cosequence registers, and present and starting location registers associated with each of the plurality of read-write channels utilized to communicate between main memory and a plurality of peripheral devices, not shown. The plurality of storage registers comprising the control memory 13 are addressed through a control memory address register 23. Information is transferred into the control memory from either the auxiliary register 17 or as the output of an adder indicated generally as member 25, by way of a control memory local register 27. In addition, the control memory 13 is capable of transferring any of its stored information into the main memory address register 15 by way of associated sense amplifiers indicated generally as member 29.

Reference is now made to the adder portion of FIGURE 1 which is capable of performing both binary and decimal arithmetic. Two operand storage registers 31 and 33 are operatively connected to the input of adder 25 and provide means for storing the A and B operand data during the processing of program instructions. Information enters the A and B operand registers from the main memory local register 21. Included in the adder 25 is a carry-function portion 35 which effects the selective combination of signals from corresponding stages of the A and B operand registers 31 and 33 with carry signals being generated in the four stages thereof by means not shown. This selective combining of signals is effected in accordance with signals generated in an associated sub-command decoder 37 which defines the sequence of activities during the extraction phase of each instruction and further identifies the current operation as being logical or arithmetic in nature.

Output signals from corresponding stages of the A and B operand registers 31 and 33 are combined with signals from the carry-function portion 35, in a sum register 39. The output of the sum register 39 is connected to a sum decoder 41 wherein the signal representation is recorded in a decimal notation if the original representation is decimal; while for binary operation, the resultant representation is permitted to bypass the decoder unchanged. Normally, the output of the sum decoder is transferred to the main memory local register 21 for subsequent storage in the main memory 11. For a more detailed explanation of the construction and operation of the adder 25, reference is made to the co-pending application of William J. Maczko and Walter R. Lethin, bearing Ser. No. 376,348, filed June 19, 1964.

Two additional registers 43 and 45 are provided for storing the operation code and the operation code modifier respectively. The operation code, which will hereafter be referred to more simply as the O*p* code, defines the fundamental operation being performed by the program instruction. The O*p* code modifier, or variant character, may be used to extend the definition supplied by the O*p* code.

Also shown in FIGURE 1 is a special clock and sequence cycle register 47 which is activated whenever the central processor is engaged in the processing of program instructions or other central processor orders. The clock and sequence cycle register 47 together with the O*p* code register 43 and the O*p* code modifier 45 are connected to the sub-command decoder unit 37 which, as explained above, defines the sequence of activities within the adder 25. Connected to the ouputs from both the O*p* code and O*p* code modifier registers 43 and 45 is an operational mode register 49. One function of the operational mode register 49 is to store an indication depicting whether, the system is operating in the item mark trapping mode; i.e., whether in the processing of a program instruction, the system is to be responsive to a bit occurring in a particular one of the two punctuation levels of bits during the extraction of the first character of a program instruction. For purposes of the present invention, the operational mode register may comprise a single flip-flop; however, as disclosed more completely hereinafter, by merely enlarging the storage capacity, the functional role of the operational mode register may be extended to include the representation of information depicting other optional modes of operation of the data processing system as the interrupt mode, and the variable number of characters per address mode.

The output of the operational mode register 49 is coupled to the input of a special function generator 51. Also coupled as inputs to the function generator 51 are outputs from the clock and sequence cycle register 47 and a signal indicating the nature of the bit representation in a particular one of the two levels of punctuation bits of the character being extracted from main memory as temporarily stored in the main memory local register 21. The purpose and nature of operation of the special function generator 51 is disclosed more fully below with respect to FIGURE 2 and the discussion which follows.

In a preferred embodiment of the present invention, the processing of data and instructions proceeds on a character basis with a single multi-bit character being transferred from main memory during each memory cycle interval. In any programmed operation, the first step is to remove from memory the next instruction to be processed. Thus, as an instruction is processed, the characters of the instruction are transferred one by one out of successive main memory locations into the various operational registers of the central processor and control memory. A typical program instruction may include as few as one character or as many as ten or more depending upon the type of instruction and the mode of addressing.

Figure 2:
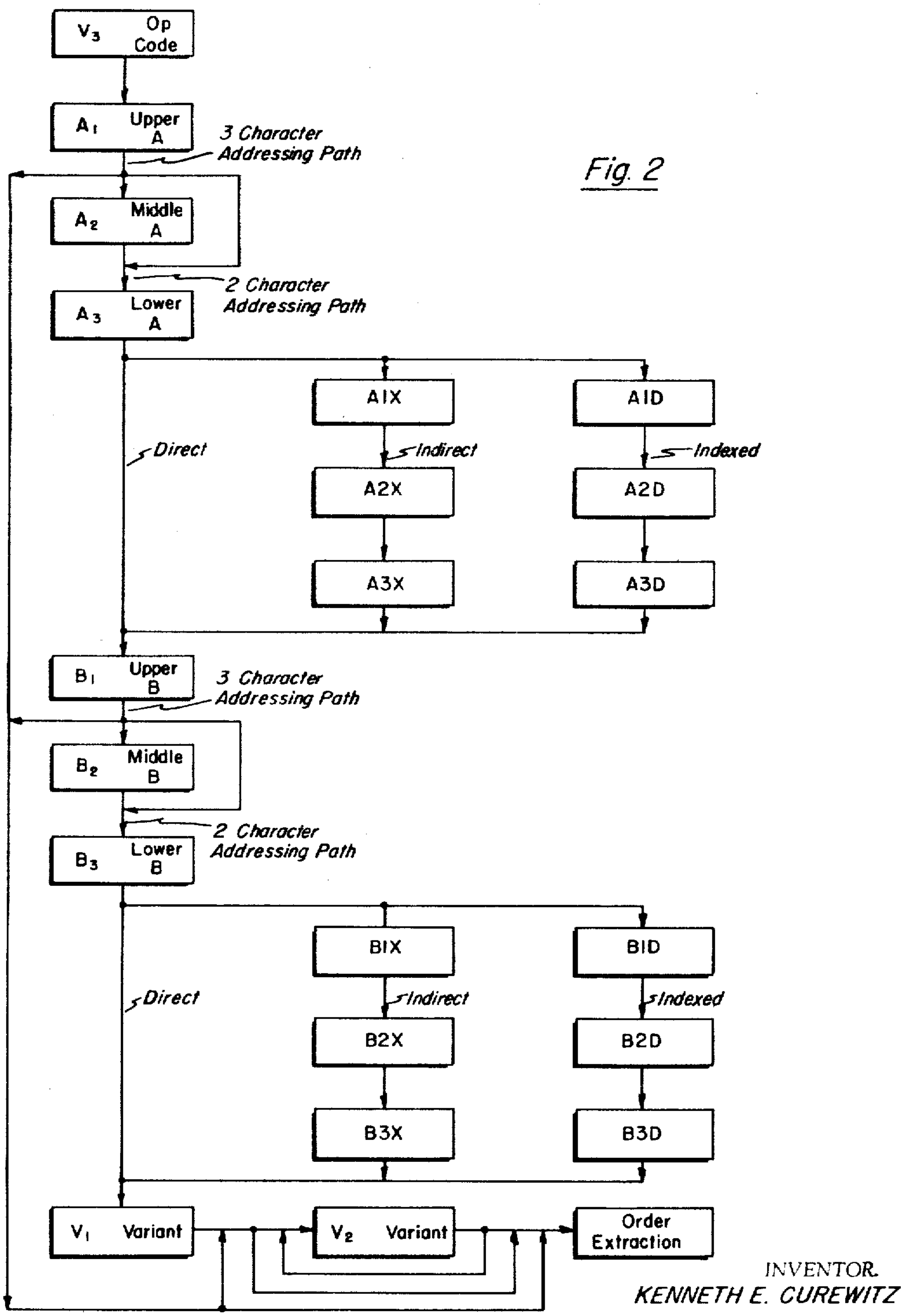
FIGURE 2 is a diagrammatic representation depicting the various flow paths corresponding to the extraction of characters of a program instruction during subsequent operative cycles.

The processing of an instruction involving arithmetic or logical operations occurs in two operative steps; namely, the characters of the instruction are first extracted from main memory whereafter the data identified by the extracted characters is operated upon. Reference is now made to FIGURE 2 which discloses a flow chart depicting the memory cycles as allocated to the processing of the various characters of a program instruction during the extraction phase thereof. More specifically, the extraction phase of a program instruction is initiated with the contents of a location in main memory as specified by the sequence register of the control memory 13, being extracted therefrom and identified as the O*p* code character indicated herein as V3. This is followed by the processing of a character A1; whereafter it is established whether the operation is to proceed in a two-character or three-character addressing mode.

For purposes of this invention, a designation two-character, three-character, or N-character addressing mode pertains to the ability to effect the referencing of a particular location within an addressable memory by specifying two, three or N characters in the address field of each instruction notwithstanding the fact that the two, three or N characters in themselves are not capable of completely defining a memory location because of the physical size of the memory. For further insight into the advantages and objects of a data processing apparatus capable of utilizing a variable number of characters to effect the addressing of an extended memory, reference is made to the co-pending application of Walter R. Lethin and Michael H. Blume, bearing Ser. No. 382,891 and filed July 15, 1964.

If the operation is to proceed in a two-character addressing mode, the flow path bypasses character A2 and jumps immediately into the processing of character A3. Alternatively, if the system is operating in the three-character addressing mode, the flow path continues through the characters A2 and A3 whereupon a test for direct, indirect or indexed addressing mode is effected. Accordingly, the flow path continues through A1*x*, A2*x*, and A3*x* if operating in the indexed mode and A1*d*, A2*d*, and A3*d* if operating in the indirect mode.

In a similar manner, characters B1, B2 and B3 are brought out and tested for the above conditions and the corresponding flow path followed. The variant characters V1 and V2, as well as any additional variant characters, are subsequently brought out to complete the extraction phase.

Reference is now made once more to FIGURE 1, which is utilized in further explanation of the extraction cycles effected during each of the above identified time phases. Thus the extraction of the *Op* code character of a typical program instruction is initiated with the information contained in the bit locations 1 through 15 of the sequence register of control memory 13 being transfered through associated ones of the sense amplifiers 29 into corresponding stages of the main memory address register 15; whereupon, the information located in he main memory 11 is transferred through the associated sense amplifiers 19 to the main memory local register 21. After effecting the information transfer from the main memory 11, the digital representation within the main memory address register 15 is incremented in the auxiliary register 17 and subsequently reloaded into the sequence register of the control memory 13 to thereby identify the location in main memory of the succeeding character of the program instruction to be extracted.

The succeeding character, identified by the previously incremented representation as stored in the sequence register of the control memory 13, proves in the general instance to be the upper character of the A operand address field. Assuming the operation to be in the three-character addressing mode, the digital representation is transferred from the sense amplifiers 29 associated with the control memory 13 and entered into the main memory address register 15 to initiate the extraction from main memory of the information pertaining to the upper character of the A operand. The information stored in the addressed location of main memory 11 is transferred through the main memory sense amplifiers 21 into the main memory local register 19. This information is in turn temporarily stored in the *Op* code modifier register 45, the upper three bits of which indicate whether the type of addressing to be followed in the processing of the current program instruction is direct, indirect, or indexed.

Normally, the address portion of an instruction specifies the address of a particular data field in the main memory. This manner of addressing a data field is referred to as direct addressing. In some instances, it is more useful to be able to specify the storage location of another address which in turn specifies the location of a desired data field. This second manner of addressing is referred to as indirect addressing. The third manner of addressing is indexing in which the contents of an index register are automatically added to an address field in the instruction.

The information stored in the addressed location of main memory 11 is also retained in the B operand register 33 for transmission during a subsequent operative cycle to the control memory local register 27. Somewhat simultaneously, the information previously stored in the main memory address register 15 is incremented and returned to the sequence register of the control memory 13.

Referring once more to the flow chart of FIGURE 2, it is seen that at this time the appropriate portion of the operational mode register is scanned to ascertain whether the addressing is to proceed in the two or three-character mode; that is, whether the information entered during the A1 cycle is actually the upper character of the A operand address or the middle character thereof. If the operation were being processed in the two-character addressing mode, the memory cycle normally allocated to the extraction of the A2 character would be allocated instead to the extraction of the A3 character, whereafter the succeeding available memory cycle interval is utilized to effect the extraction of the B1 operand character.

If, as has been assumed in the present instance, the operation is proceeding in the three-character addressing mode, the characters A2 and A3 are extracted during succeeding memory cycle sub-intervals whereafter the information transferred into the *Op* code modifier register 45 during the A1 cycle is scanned to ascertain whether the processing is in the direct, indirect, or indexed mode. If direct addressing is used, the succeeding operative cycle is allocated to the extraction of the B1 character while for indirect addressing, the processing will proceed with the extraction of characters A1*d*, A2*d*, and A3*d* during succeeding available memory cycle sub-intervals and indexed addressing will proceed with the extraction of the A1*x*, A2*x*, and A3*x* characters during corresponding time intervals. Indexed addressing may be performed by appending to the address being modified a code to indicate which one of a plurality of reserved storage locations in the main memory 11 is to be used. In a similar manner, an indirect address specifies the uppermost character of a field containing another address.

In the processing of a program instruction wherein the general format involves both A and B operand address fields, the succeeding memory cycle sub-intervals will be used in the extraction of the B operand address information in the manner similar to that outlined above for the extraction of the A operand address information and as depicted in the flow chart of FIGURE 2. Subsequent to the extraction of the A and B operand address information, the variant characters V1 and V2 are processed to complete the extraction phase of the operative instruction. With respect to the extraction of the variant characters, the data contents of the location in main memory 11 specified by the sequence register of the control memory 13, as incremented, are transferred to the *Op* code modifier register 45.

The operational mode register 49 of FIGURE 1 is set by a program instruction, the format of which appears as *F/V*. With reference to FIGURES 1 and 2, it is seen that as the *Op* code or V3 character is extracted from main memory, it is deposited in the *Op* code register 45. More specifically, the contents of the sequence register of the control memory 13 are transferred through the associated sense amplifiers 29 into the main memory address register 15. This information specifies a particular location in main memory from whence the information stored therein is transferred though the associated sense amplifiers 19 into the main memory local register 21 for subsequent transmission to the O*p* register 45. After the O*p* code character has been extracted from main memory, the contents of the main memory address register 15 are incremented and returned through the control memory local register 27 to the sequence register of the control memory 13.

In accordance with the format outlined above for the change operational mode instruction, the A and B extraction cycles are bypassed. However, in accordance with the flow chart of FIGURE 2, the next scheduled cycle following the extraction of the O*p* code is the A1 cycle which occurs during the extraction phase of each program instruction; however, since in the processing of the change operational mode instruction, the A and B extraction cycles are bypassed, the succeeding character to be extracted in the processing of this instruction is the variant character. Accordingly, the variant character is brought out of the sequence register during the cycle normally designated A1. During this time interval, the information within the sequence register of the control memory 13 is transferred to the main memory address register 15 and the information stored in the location of the main memory 11 so addessed is transferred through the associated sense amplifiers 19 into the main memory local register 21 from whence it is transferred to the A operand register 31 and ultimately to the O*p* code modifier register 45. After processing the variant character, the sequence of cycles as shown in the flow chart of FIGURE 2 is followed with a reinsertion into the main traffic flow path thereof being effected at the V2 cycle level.

During the processing within the V2 time cycle in a change operational mode instruction, the information within the sequence register of the control memory 13 prior to its transfer to the main memory address register is detected as having a characteristic "end-instruction" punctuation bit associated therewith. This punctuation bit is designated a "word-mark" which in the preferred embodiment of the present invention is identified by a bit represented in the seventh level or plane of bits in an operative character. The detection of the word-mark indicates in this particular instance, that the character presently in the sequence register is actually the O*p* code of the next instruction thereby establishing that the extraction phase of the present instruction is complete.

The execution phase of the change operational mode instruction is effectively completed by the processing of what is essentially a blank cycle wherein the information contained in the sequence register of the control memory 13 is transferred into the main memory address register 15, incremented, and returned to the main memory local register associated with the control memory; however, the incremented transfer is prevented from being restored into the sequence register of the control memory. Since the sequence register of the control memory 13 was not incremented, and since it previously contained the O*p* code of the succeeding instruction, the information pertinent to the processing of the succeeding instruction will remain in the sequence register pending the completion of the execution phase of the present instruction.

During the execution of the "blank" cycle, no information transfer from the main memory is attempted. However, a particular bit of the variant character as stored in the O*p* code modifier register 45 is sensed and the result of the sensing operation is utilized to set the associated flip-flop of the operational mode register 49 to a particular one of its bistable conditions. During the processing of a subsequent program instruction, the flip-flop associated with the operational mode register 49 indicates whether the program is proceeding in the item mark trapping mode, i.e., whether the system is responsive to the presence of a bit in the eighth level of bits of a character being extracted from main memory.

Figure 3:
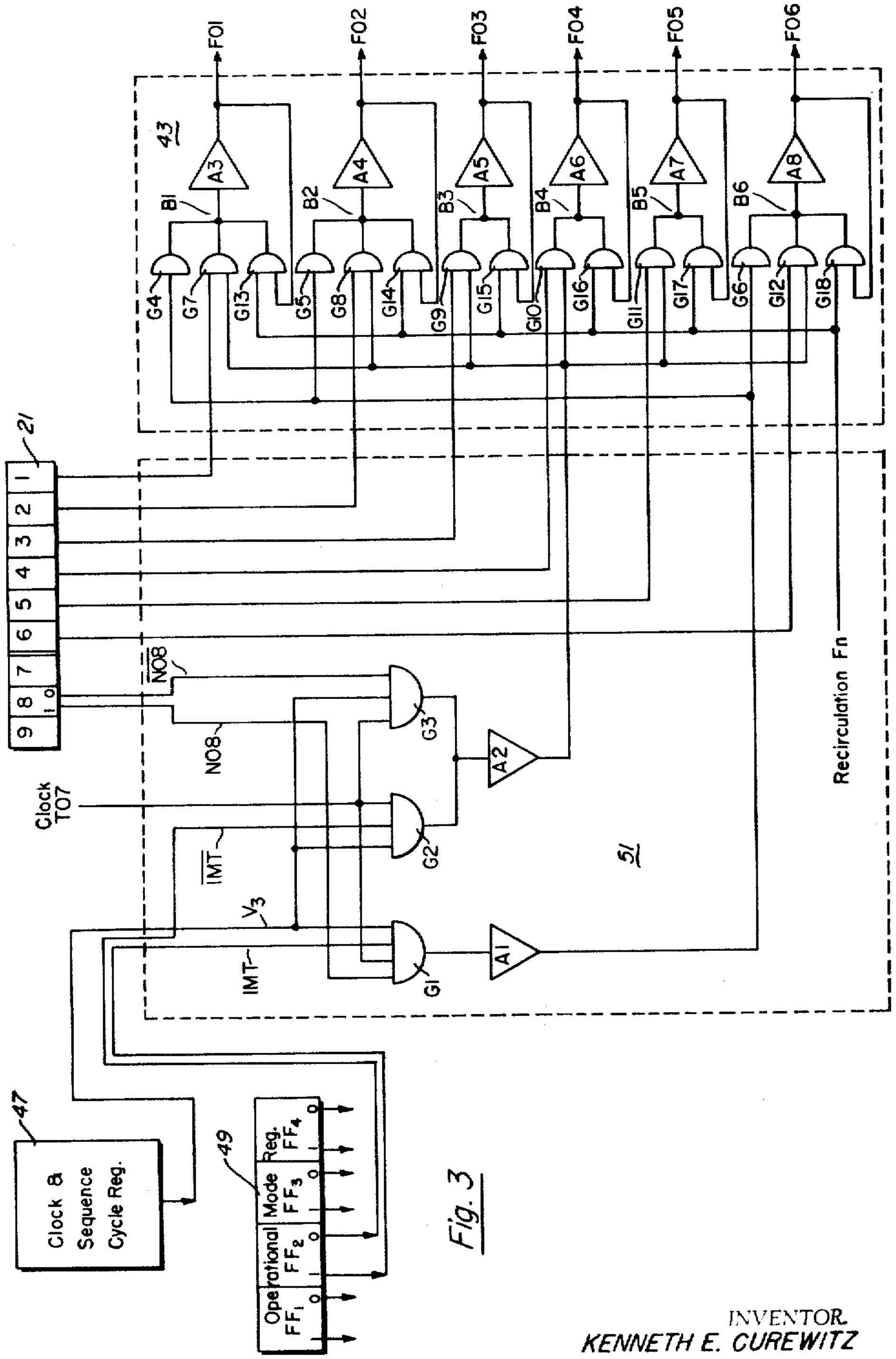
FIGURE 3 is a diagrammatic representation of a portion of FIGURE 1 and particularly discloses the logic associated with the special function generator thereof.

Before continuing with the discussion of the operation of the subject system in response to the detection of a bit in the eighth plane of the first character of a program instruction as extracted from main memory, reference is made to FIGURE 3 which discloses in specific detail the logic of the special function generator 51 of FIGURE 1 as well as the registers associated directly therewith; including, the clock and sequence cycle register 47, the operational mode register 49, the main memory local register 21, and the O*p* code register 43. The operational mode register 49 is indicated as being comprised of a number of flip-flops $FF_1 \rightarrow FF_4$ which function to store various control bits pertinent to the processing of information in the various modes including the item mark trapping mode as well as the interrupt mode and the variable number of characters per address mode. As indicated, means are provided to connect the output signal from the clock and sequence cycle register 47 to each of three conventional And gates G1, G2 and G3. The function of the output signal from the clock and sequence cycle register 47 is to condition each of the gates G1, G2 and G3 during the extraction phase of the first character of a program instruction corresponding to the V3 cycle of FIGURE 2. Also shown as being connected in common to each of the gates G1, G2 and G3 is a timing signal TO7 from a source of clocking signals which in the actual implementation may be that provided by the clock portion of the clock and sequence cycle register 47.

The conditioning of gate G2 is completed upon receipt of an item mark trapping not signal; that is a signal indicating that the system is not operating in the item mark trapping mode and hence will not respond to the presence of a one bit in the eighth bit level during the extraction of the first character of a program instruction. The item mark trapping not signal is taken off the reset side of the flip-flop marked $FF_2$ which, as mentioned above, represents one stage of he operational mode register 49. In a similar manner, the conditioning of gate G3 is completed by a signal indicating the presence of a binary zero in the eighth bit level of the main memory local register 21.

The conditioning of either gate G2 or gate G3 is effective in generating an output signal from an amplifier A2 to thereby enable the free transfer of the contents of the main memory local register 21 to the O*p* code register 43. In this respect, the output of the amplifier A2 is connected as a common conditioning signal to a plurality of And gates G7, G8, G9, G10, G11, and G12. Gates G7 through G12 are further conditioned by signals from stages 1 through 6 of the main memory local register 21. The outputs of gates G7 through G12 are buffered through OR gates B1 through B6 respectively, the outputs of which in turn serve as inputs to a plurality of amplifiers A3 through A8. Connected to the outputs of amplifiers A3 through A8 are feedback lines which return the output signals therefrom to the input of a plurality of And gates G13 through G18. Also associated with the inputs to gates G13 through G18 is an input signal representing a recirculation function which completes the conditioning of any one of the partially conditioned gates G13 through G18.

In the operation of the above-outlined portion of the circuit, and in the absence of either a bit in the eighth bit level of the gating memory local register 21 or a signal indicating that the system is presently operative in the item mark trapping mode, and during the extraction of the first character of a program instruction, either gate G2 or gate G3 will be conditioned thereby generating an output signal which is transferred through amplifier A2 to serve as a conditioning signal to gates G7 through G13. The presence of a binary one in any of the information bit locations 1 through 6 of the main memory local register 21 is thus effective in completing the conditioning of the partially conditioned gates G7 through G13, thereby generating a signal at the outputs of the associated amplifiers A3 through A8. The recirculation circuit including gates G13 through G18 thereafter lock the respective amplifiers A3 through A8 in operation pending the termination of the recirculation function signal. The signal representation on the output of amplifiers A3 through A8 represent associated stages of the *Op* code register 43, the outputs of which constitute the lines FO1 through FO6.

In addition to being conditioned by the clock signal and a signal indicating that the present operative cycle is directed to the extraction of the first character of a program instruction, the completion of the conditioning of gate G1 is effected by signals indicating that the system is presently operating in the item mark trapping mode and that the eighth bit level of the first character of the program instruction as presently stored in the main memory local register 21 has a one bit associated therewith. After being transferred through amplifier A1, the output signal of gate G1 becomes effected in generating signals on the outputs of amplifiers A3 through A8 which will correspond to the digital representation of a change sequence cycle *Op* code. In order to effect this, single legged gates G4, G5 and G6 have their inputs connected in common to the output of amplifier A1 whereby any signal appearing thereon will be buffered through the respective buffering devices B1, B2 and B6 and thence through the associated amplifiers A3, A4 and A8 of the *Op* code register 43. This in turn forms the equivalent octal representation $43_8$ which is transferred via lines FO1 through FO6 from the OP code register 43 to the Sub-command Decoder 37 of FIGURE 1 wherein it is interpreted as the *Op* code of the change sequence mode instruction. It should be noted that the occurrence of a signal IMT indicating that the system is operative in the item mark trapping mode. Together with the signal NO8 indicating that a binary one is presently located in the eighth level of an *Op* code character being extracted from main memory, inhibits the amplifier A2 from coming on thereby disabling the transfer of the actual *Op* code into the *Op* code register.

The operation of this portion of FIGURE 3 is dependent upon the satisfaction of three conditions, namely: that flip-flop $FF_2$ of the operational mode register 49 is set (i.e. the "one" output is active); the sequence cycle register 47 indicates that the present operative cycle is being allocated to the extraction of the first character of the program instruction; and, during the extraction of the first character of a program instruction a "one" bit is detected in the eighth bit plane thereof. Upon satisfaction of the above-outlined conditions, the signals transferred to the special function generator 51 are effective in conditioning an output therefrom so that the digital representation in bit locations 1 through 6 of the main memory local register 21 are inhibited from being transferred into the *Op* code register 43 and instead a digital representation indicative of the *Op* code of the change sequence mode instruction is forced into the *Op* code register.

The presence in the *Op* code register of the digital representation indicative of the change sequence mode instruction is effective in the normal manner to initiate the interchange of the contents of the sequence and co-sequence registers of control memory 13. Somewhat simultaneously, the sense amplifiers 19 have restored the character of information as extracted, into its original location in main memory.

As mentioned above, the principles of the present invention find particular use in translational routines. Accordingly, in the implementation of a data processing apparatus for use in such a capacity, the detection of a bit in the eighth bit plane during the processing of the first character program instruction effects an interchange of the contents of the co-sequence and sequence registers of the control memory 13. The sequence register then represents the address of the first character of a program instruction which directs the referencing of the location in main memory containing the character which when extracted initiated the present change sequence mode operation. Once removed from memory, the information bits of the first character are utilized to indirectly identify the particular sub-routine through specification of the address of a reserve location in main memory containing the first character thereof. In the preferred embodiment of the present invention, the digital representation of the extracted character is interpreted as a binary coded representation which when doubled and redoubled and subsequently added to a base address define the location of the first character of an extended program instruction capable of completely defining the operation originally specified in the one character code of the program compiled for the foreign data processing apparatus.

With respect to the compatibility of the change sequence mode instruction as initiated by the item mark trapping technique and the same instruction initiated by the regular *Op* code, the programmer has available to him the alternative of effecting all change sequence mode operations by utilization of the item mark trapping technique or alternatively of utilizing both the item mark trapping technique in combination with the conventional method of specifying the operation through use of the *Op* code corresponding to the change sequence mode instruction. When the item mark trapping technique is utilized exclusively, no additional memory cycles are required to effect the operation; however, a limitation on the possible number of sub-routines is established which is in direct proportion to the number of information bits per character.

Alternatively, the change sequence mode of operation may be entered in a conventional manner by the specification of the *Op* code thereof provided that care has been taken to periodically specify changes in the contents of the co-sequence register of the control memory as the responsive to a conventional change sequence mode *Op* processing of the program proceeds. This is particularly necessary where the data processing apparatus is implemented to effect both item mark trapping and also be code since therein it is necessary to insure that the co-sequence register will contain the proper representation so as to permit entrance into the look-up table as necessitated and at other times contain information pertinent to the specification of a particular main memory location.

It will be apparent from the foregoing disclosure of the preferred embodiment of the invention that numerous modifications, changes and equivalents will now occur to those skilled in the art, all of which fall within the true spirit and scope contemplated by the preferred embodiment of the invention.

What is claimed is:

1. A character-oriented data processing apparatus adapted to operate with an instruction format which normally includes an operation specifying portion which for each individual instruction being processed dictates the nature of the current operation, said data processing apparatus further including means capable of effecting the translation of a set of program instructions originally compiled for operation in a foreign data processing apparatus wherein it is desired to maintain one-for-one memory mapping between memory unit locations as specified in said foreign program with those available in an addressable memory unit of said character oriented data processing apparatus and wherein each of said characters of information is comprised of a plurality of information and punctuation bits, said information bits of a particular character normally comprising said operation specifying portion of an instruction comprising an addressable multi-location memory unit, each location of said memory unit being adapted to store a single character of information, means for addressing particular locations within said addressable memory unit, temporary storage means operatively connected with the output of said memory unit for receiving information therefrom, means associated with said temporary storage means to sense the bit representation of each of said characters of information being extracted from said memory unit, and means actuated upon detection of a particular punctuation bit associated with said operation specifying portion of a program instruction to completely define a particular operation of said data processing apparatus and to initiate the execution thereof, and means including said last-named means operative upon detection of said particular punctuation bit for storing said informational bits associated with said operation specifying portion of a program instruction so as to thereby identify said bits as comprising a parameter of information to be used in the execution of said particular operation.

2. The combination of a multi-channel data processing apparatus including means to effect the translation of a computer program compiled in a first operative code into a program compatible with said first operative code but being further distinguished by a shortened processing time, comprising a memory unit for storing indicia on a character basis said indicia representing individual program instructions, means including a control memory for addressing specific character locations within said memory unit, said control memory further comprising a sequence and a co-sequence register the contents of which are alternatively operative in controlling the processing of a program instruction, temporary storage means associated with the output of said memory unit to store a character of information as it is extracted from said addressed memory location, means associated with said temporary storage means to scan the successive bit positions of said character of information extracted from said memory unit so as to detect a particular bit configuration which identifies a program instruction as being associated with a different operative format than that capable of being accepted by the present data processing system, and means operative upon the detection of said particular bit configuration to initiate the interchange of the contents of said sequence and co-sequence registers of said control memory.

3. Apparatus in a character-oriented data processing device for controlling the processing of program instructions arranged in addressable locations of a memory unit, said apparatus normally specifying a particular mode of operation by means of the first character of a program instruction to be extracted from said memory unit, each of said characters being further comprised of at least six information bits and two punctuation bits, said punctuation bits normally serving to define the limits on the transfer of successive characters of information, comprising an addressable multi-location memory unit, a multi-stage register operatively connected to the output of said memory unit for receiving a plurailty of bits representing a character of information being extracted from said memory unit, sensing means associated with at least one stage of said multi-stage register to sense a particular punctuation bit in the first character of a program instruction being extracted from said memory unit, means including said last-named means operative upon detection of said particular punctuation bit in association with said first character of a program instruction to be extracted to initiate a predetermined mode of operation in said data processing apparatus, and means to store the information bits of said first character to specify a particular operating parameter to be used in the execution of said predetermined mode of operation of said data processing apparatus.

4. In a stored program type character-oriented data processing apparatus wherein the processing of program instructions proceeds through a sequential routine and wherein each of said characters of information is comprised of a plurality of information and punctuation bits, said punctuation bits normally serving to define the limits on the transfer of successive characters of information the combination comprising an addressable multi-location memory unit, means for addressing specific locations within said memory unit, temporary storage means operatively connected to the output of said memory unit for receiving characters of information therefrom, sensing means associated with said temporary storage means to sense the bit representation of each character of information entered therein, and means responsive to the detection of a particular punctuation bit of said bit representation of a character of information to identify a particular mode of operation of said data processing apparatus in which mode of operation the information content of said bit representation is utilized to specify any one of a plurality of sub-routines.

5. In combination with a stored program type data processing apparatus of the type adapted to effect the processing of a character of information of an operative routine during each succeeding operative cycle and wherein each of said characters of information is comprised of a plurality of information and punctuation bits, the latter normally serving to define the limits of a program instruction and its associated data field, comprising an addressable multi-location memory unit, each location of which is adapted to store a single character of information, means for addressing a particular location within said memory unit, temporary storage means operatively connected to the output of said memory unit for receiving a character of information as it is extracted from said memory unit, sensing means associated with said temporary storage means to sense the bit representation of each character of information as it is entered therein, and means responsive to the detection of a particular punctuation bit representation associated with a character of information to thereby establish a particular mode of operation and means to utilize the information content of said character of information to specify the address within said memory unit of the first instruction of any one of a plurality of operative routines.

6. In a character-oriented data processing apparatus of the stored program type wherein the processing of program instructions proceeds through a sequential routine and wherein each character of information is comprised of a plurality of information and control bits, said information bits of a particular character normally interpreted as an operation specifying portion of a program instruction to thereby dictate the nature of the current operation, the combination comprising an addressable multi-location memory unit, means for addressing specific locations within said memory unit, temporary storage means operatively connected to the output of said memory unit for receiving characters of information therefrom, sensing means associated with said temporary storage means to sense the bit representation of each character of information entered therein, means responsive to the detection of a particular control bit representation within a character of information to modify the mode of operation of a data processing apparatus in a manner which is independent of the mode of operation normally established by the information bits of said character, and means to enable the information content of said bit representation to be utilized to specify any one of a plurality of sub-routines to be operative in said modified mode of operation.

7. In a character-oriented data processing apparatus having a multi-location memory unit and including means capable of effecting the translation of a set of program instructions originally compiled for operation on a foreign data processing apparatus wherein it is desired to maintain one-for-one memory mapping between memory unit locations as specified in said foreign program and those available in said memory unit of said data processing apparatus and wherein each of said characters of information is comprised of a plurality of bits, the combination comprising an addressable multi-location memory unit, means for addressing specific locations within said memory unit, temporary storage means operatively connected to the output of said memory unit for receiving characters of information therefrom, sensing means associated with said temporary storage means to sense the bit representation of each character of information entered therein, means responsive to the detection of a particular punctuation bit of said representation of a character of information to identify said character of information as representing an otherwise incompatible instruction format and means including said last-named means operative upon detection of said particular punctuation bit to transfer control to a second operative routine wherein the non-compatible instruction is expressed by way of an extended format.

8. In a character-oriented data processing apparatus of the stored program type having a multi-location memory unit and including means capable of effecting the translation of a set of program instructions originally compiled for operation in a foreign data processing apparatus wherein due to a desire to maintain one-for-one memory mapping between memory unit locations as specified in said foreign program and those available in said memory unit of said data processing apparatus there exists a partial non-compatibility of programming formats for particular ones of said program instructions and wherein each of said characters of information is comprised of a plurality of bits, the combination comprising an addressable memory unit, means including a control portion for addressing specific locations within said memory unit, said control portion further comprising a sequence and a co-sequence register the contents of which are alternatively effective in controlling the processing of a program instruction, temporary storage means operatively connected to the output of said memory unit for receiving characters of information transferred therefrom, means associated with said temporary storage means to sense the bit representation of each character entered therein, and means responsive to the detection of a particular bit representation to identify said character of information as representing one of said non-compatible instruction formats and for initiating the interchange of the content of said sequencing and co-sequence registers of said control portion.

9. In a character-oriented data processing apparatus of the stored program type wherein the processing of program instructions proceeds through a sequential routine and wherein each of said characters of information is comprised of a plurality of bits, the combination comprising an addressable memory unit, means for addressing specific locations within said memory unit, a sequence cycle register effective in orienting the information extracted from said memory unit in accordance with the operative format established by the first character of a program instruction, temporary storage means operatively connected to the output of said memory unit for receiving characters of information transferred therefrom, an operational code register connected to the output of said temporary storage means to store said operative format, means further associated with said temporary storage means to sense the bit representation of each character of information entered therein, said last-named means further comprising a first gating device partially conditioned by signals generated in said sequence cycle generator indicating that the present operative cycle is directed to the processing of the first character of a program instruction, said first gating device being further responsive to the presence of a particular bit representation of said character of information to thereby inhibit the storage of said operational character and forcing into said operational code register in its stead the operational code associated with a change sequence mode instruction.

10. In a character-oriented data processing apparatus of the stored program type having a multi-location memory unit and including means capable of effecting the translation of a set of program instructions originally compiled for operation in a foreign data processing apparatus wherein due to a desire to maintain one-for-one memory mapping between memory unit locations as specified in said foreign program and those available in said memory unit of said data processing apparatus there exists a partial non-compatibility of programming formats for particular ones of said program instructions and wherein each of said characters of information are comprised of a plurality of bits, the combination comprising an addressable memory unit, means including a control memory for addressing specific locations within said memory unit, said control memory further comprising a sequence and a co-sequence register the contents of which are alternatively effective in controlling the referencing of memory unit locations, a sequence cycle register operatively connected to said control memory and effective in orienting the flow of information extracted from said main memory in accordance with the operative format established by the first character of a program instruction, temporary storage means operatively connected to the output of said memory unit for receiving characters of information transferred therefrom, an operational code register connected to the output of said temporary storage means to store said operative format, means further associated with said temporary storage means to sense the bit representation of a character of information entered therein, said last-named means further comprising a first gating device partially conditioned by signals generated in said sequence cycle generator indicating that the present operative cycle is directed to the processing of the first character of program instruction, said first gating device being further responsive to the presence of a particular bit representation of said character of information to thereby inhibit the storage of said operational character and for causing to be transferred into said operational code register in its stead the operational code associated with a change sequence mode instruction.

11. In a character-oriented data processing apparatus of the stored program type wherein each character of said program instruction is comprised of a plurality of information and control bits, the former when associated with a particular character of a program instruction normally serving to define a particular mode of operation to be executed by said data processing apparatus, the combination comprising an addressable multi-location memory unit, means for addressing specific locations within said memory unit, temporary storage means operatively associated with the output of said memory unit for receiving characters of information therefrom, sensing means associated with said temporary storage means to sense the bit representation of each character of information entered therein, and means responsive to the detection of a particular control bit within said particular character of a program instruction to establish a mode of operation within said data processing apparatus which is independent of said mode of operation normally established by the information bits of said particular character of said program instruction.

References Cited

UNITED STATES PATENTS 3,222,649 12/1965 King -------------- 340—172.5

ROBERT C. BAILEY, *Primary Examiner.*

G. D. SHAW, *Assistant Examiner.*